US009847000B2

(12) United States Patent
Ullrich et al.

(10) Patent No.: US 9,847,000 B2
(45) Date of Patent: Dec. 19, 2017

(54) AMBIENT TRIGGERED NOTIFICATIONS FOR RENDERING HAPTIC EFFECTS (71) Applicant: Immersion Corporation, San Jose, CA (US)

(72) Inventors: Christopher J. Ullrich, Ventura, CA (US); Jamal Saboune, Montreal (CA)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 14/926,280

(22) Filed: Oct. 29, 2015

(65) Prior Publication Data
US 2017/0124818 A1    May 4, 2017

(51) Int. Cl.
*G08B 21/00*    (2006.01)
*G08B 6/00*    (2006.01)

(52) U.S. Cl.
CPC ..................... *G08B 6/00* (2013.01)

(58) Field of Classification Search
CPC ........................................................ G08B 6/00
USPC .................. 340/628, 629, 630, 407.1, 407.2
See application file for complete search history.

(56) References Cited

U.S. PATENT DOCUMENTS

| 4,297,677 A * | 10/1981 | Lewis ..................... G08B 6/00 340/4.11 |
| 8,204,238 B2 * | 6/2012 | Mozer .................... H04B 11/00 340/384.4 |
| 2009/0003620 A1 | 1/2009 | McKillop et al. |
| 2012/0028577 A1 | 2/2012 | Rodriguez et al. |
| 2014/0270681 A1 | 9/2014 | Sen et al. |
| 2014/0313040 A1 * | 10/2014 | Wright, Sr. ............ G08B 17/10 340/628 |
| 2015/0005039 A1 | 1/2015 | Liu et al. |

FOREIGN PATENT DOCUMENTS

| EP | 2778850 A1 | 9/2014 |
| EP | 2790099 A1 | 10/2014 |

OTHER PUBLICATIONS

Poulami Dutta et al., "Data Hiding in Audio Signal: A Review", International Journal of Database Theory and Application vol. 2, No. 2, Jun. 2009, pp. 1-8.

* cited by examiner

*Primary Examiner* — Jeffery Hofsass
(74) *Attorney, Agent, or Firm* — Medler Ferro Woodhouse & Mills PLLC (57) ABSTRACT

A method of rendering a haptic effect on a haptic output device is provided based on an ambient environmental stimulus signal received from a sensor. A notification event based on the stimulus signal is determined. A haptic effect is rendered on a haptic output devices based on the notification event. A system and computer-readable medium are also provided for rendering a haptic effect on a haptic output device based on an ambient environmental stimulus signal.

24 Claims, 9 Drawing Sheets

AMBIENT TRIGGERED NOTIFICATIONS FOR RENDERING HAPTIC EFFECTS

FIELD

One embodiment is directed to a notification system. More particularly, one embodiment is directed to a notification system that can output notifications based on ambient input.

BACKGROUND INFORMATION

Users may receive alerts on their phone or other electronic devices. Typically, users will have a relationship with the entity sending the alert and the alert will typically be generated based on some digitally received information. For example, a user can install a weather application. The weather application can digitally connect to weather status servers, receive an alert, and pass the alert on to the user through the application by triggering the phone to beep or vibrate.

Conventional systems provide alerts based on an established relationship with the alert giver and use data capabilities of the device to receive information that generates the alert.

SUMMARY

Embodiments include a method of rendering a haptic effect on a haptic output device. An ambient environmental stimulus signal can be received from a sensor. A notification event based on the stimulus signal can be determined. A haptic effect can be rendered on the haptic output device based on the notification event. Other embodiments include a system and computer-readable medium to render a haptic effect on a haptic output device.

DETAILED DESCRIPTION

Embodiments allow a device user to receive a notification or alert without needing a pre-existing relationship with the alert giver and without needing a data connection. A stimulus in the ambient environment can be sensed by the device. In one embodiment, the device can recognize the stimulus and provide a notification or alert based on the recognized stimulus. In one embodiment, the device can decode information embedded in the stimulus and provide an alert based on the decoded stimulus. In some embodiments, a data connection can be used to augment the alert information. In some embodiments, a relationship between the device user and the alert giver can be previously established that sets preferences for the device holder for types of alerts can further augment the alert information.

It may be desirable or important to generate an attention-getting alert for users even in the absence of a pre-existing relationship and even in the absence of an available data connection on a user's device. For example, a store may want to alert shoppers of a sale or special promotion. Emergency personnel may want to alert people in a local area about the presence of an emergency vehicle or emergency evacuation situation. A theater may want to alert attendees of the start of a show or the end of an intermission. Typically, to achieve a broadcast alert, a public address system, siren, or other conventional mechanisms (like flashing house lights) may be used. However, in some circumstances this may not provide the desired level of attention among users. In some cases, such alerts can lose their effectiveness as an alert as users get used to them and begin ignoring them and treating them as mere background noise. For example, sirens in New York City can be ubiquitous at times. Also, the alert is limited to the conventional system and does not transmit to a device.

In contrast, embodiments described herein encode information inside existing broadcast media (e.g. audio) so that smart devices can translate this information into a notification framework suitable for use in a one-to-many communications need. In some embodiments, the notification framework can provide notification events rendered on haptic output devices, as described below. Notifications can be restricted to an area of broadcast media for a local area (e.g., a mall or city street), but in some embodiments notifications can be transported over existing media streams (e.g., broadcast television) to reach larger audiences.

Several varieties of notifications or alerts can be available depending on the notification mechanism. Branded alerts can relate to commercial uses for notifying or alerting users within an ambient area to deals and sales for particular stores or brands. Location based reminder alerts can provide notifications or alerts for users within an ambient area of some particular event within proximity to the area. For example, users in a theater can be notified that a show is about to begin simply by being in the ambient area of the stimulus that triggers the haptic alert system to provide a haptic effect. In another example, a chirping crosswalk signal can trigger an alert to a user's device related to the crosswalk status. In another example, a store in a mall can have the mall music system play notifications of a flash sale intended to drive traffic to the store through an embedded message in the music. In this example, the mall music system can be configured to play the alert stimulus embedded in mall music in select speakers in the mall (e.g., near the store having the sale) so that users in the mall with a wearable or mobile devices can get an alert based on their location and directing them to the store. Emergency alerts can provide users within an ambient area of the alert stimulus, or within a broadcast area of the alert stimulus (e.g., within an ambient area of a television or radio broadcast output), an alert related to an emergency situation, such as an evacuation or threat. An emergency vehicle siren can contain coding that would provide additional alerts to all users within the ambient range. This would benefit deaf or audio-distracted users. For example, vehicle sensors can receive siren stimulus and provide a tactile alert to drivers through their seat, steering wheel, or mobile device. In addition to these types of alerts, other alerts can include an alert or notification from an appropriately equipped physical interface to a user through the user's wearable, mobile, or personal device without requiring a pre-existing device relationship. For example, a smart light switch could be equipped with a speaker to emit an inaudible sound during user interaction which can be received by the user's wearable and used to stimulate a haptic effect as an alert, perhaps an alert that the switch will be automatically turning off the lights to warn any user's in the room to reengage the switch if needed.

A notification or alert can fall into multiple of the above example categories, another category, or no category at all. In some embodiments, an alert can be understood as being any information sent using ambient techniques as described herein to a device that can receive the information and provide the information using a notification device. An alert can be considered to be an urgent notification.

In some embodiments, the ambient stimulus causing the notification can trigger the user's device to connect to a cloud service and provide personal multimodal notifications and/or actions based on the user's profile or preferences or relationship with the alert broadcaster. For example, after receiving an notification, the user's profile may alter what type of special offer the user may receive or may cause an email to be sent, a social networking site to be updated, a credit card activity to occur, a service to trigger, or some other downstream activity. In some embodiments, user preferences can be cached on the user's device so that, if no data connection is available, a personalized notification can be provided.

In some embodiments, users can opt-in or opt-out to some kinds of notifications, such as branded or location based notifications. Emergency alerts may be prohibited from being opted out. However in some embodiments, even these might be opted out. An opt-in preference can allow a user to receive individualized offers through a data connection to a cloud or server.

In some embodiments, notifications can be provided to a user's device via the device's screen and/or speaker. In some embodiments, notifications can be provided via a haptic output device associated with the user's device.

Figure 1:
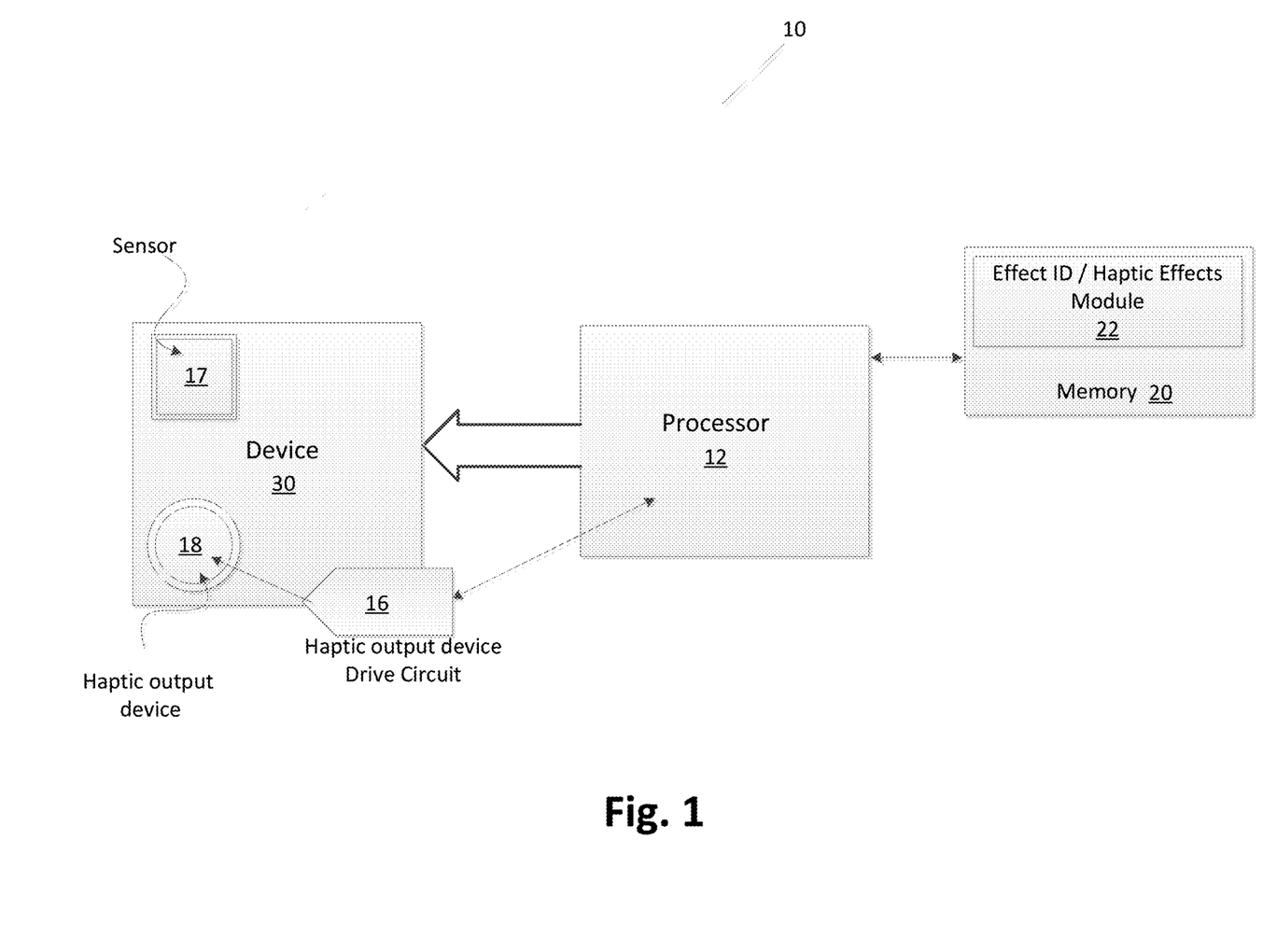
FIG. 1 is a block diagram of a notification system in accordance with one embodiment of the present invention.

FIG. 1 is a block diagram of a notification system 10 in accordance with one embodiment of the present invention. System 10 can include a device 30 that includes a haptic output device 18. Internal to system 10 is a haptic feedback system that generates haptics on system 10. In one embodiment, a haptic effect is generated by haptic output device 18. System 10 can be a handheld device such as a phone or tablet, a wearable device, such as a smart watch or smart glasses, or an accessory device that works in conjunction with another device, such as a smart watch or smart glasses that works in conjunction with other devices. System 10 can include a display and/or speakers (not pictured). System 10 can also be a device in proximity or in contact with a user, such as a car seat, steering wheel, display, bell, whistle, or any device capable of providing a haptic effect that can be perceived.

The haptic feedback system includes a processor or controller 12. Coupled to processor 12 is a memory 20 and a haptic output device drive circuit 16, which is coupled to a haptic output device 18 located on device 30. Haptic output device 18 can include any type of haptic output device, including motors, actuators, electrostatic friction ("ESF") devices, ultrasonic frequency ("USF") devices, and any other haptic output device that can be used to provide haptic feedback to a user.

Other such haptic output devices 18 may include flexible, semi-rigid, or rigid materials, including smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. A haptic effect may be considered "dynamic" if it includes some variation in the generation of haptic effects amongst haptic output device(s) or a variation in the generation of haptic effects based on a user's interaction with handheld or wearable device 30 or some other aspect of system 10, such as user preferences that specify parameters for haptic effects based on the stimulus received.

Processor 12 outputs the control signals to haptic output device drive circuit 16, which includes electronic components and circuitry used to supply haptic output device 18 with the required electrical current and voltage to cause the desired haptic effects. System 10 may include more than one haptic output device 18, and each haptic output device 18 may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes an ambient triggered haptic effects module 22 which are instructions that, when executed by processor 12, generate drive signals for haptic output device 18 that provide haptic effects based on an ambient stimulus, as disclosed in more detail below. Memory 20 may also be located internal to processor 12, or any combination of internal and external memory.

System 10 includes one or more sensors 17 that can sense aspects of an ambient environment. For example, sensors 17 can include temperature/humidity/atmospheric pressure sensors to capture environmental conditions, an inner field measurement unit ("IMU") with accelerometer, gyroscope, and magnetometer to characterize the motion, velocity, acceleration and orientation of the device, a microphone to capture audio information, an optical sensor to capture visual information, and wireless transmitters to receive/transmit information from/to other devices wirelessly. In general, sensor 17 can include any sensing device configured to or adapted to sense an aspect of an ambient input, such as, but not limited to, an accelerometer, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, microphone, photometer, altimeter, bio monitor, camera, or a light-dependent resistor. In alternate embodiments, system 10 can include one or more additional sensors, in addition to sensor 17 (not illustrated in FIG. 1). In some of these embodiments, sensor 17 and the one or more additional sensors may be part of a sensor array, or some other type of collection of sensors. The collection of sensors need not be found on the same device. For example, sensor input data can includes data from a plurality of sensors associated with the device, such as a sensor associated with a peripheral device (e.g., smart watch or wearable) of the device. Sensor 17 can provide sensor information to processor 12. Sensor information from sensor 17 can be provided to processor 12 by conventional wired or wireless techniques.

In some embodiments, haptic output device 18 is an optional feature of system 10 and notifications associated with the system can be provided via a display or speaker associated with system 10.

Figure 2:
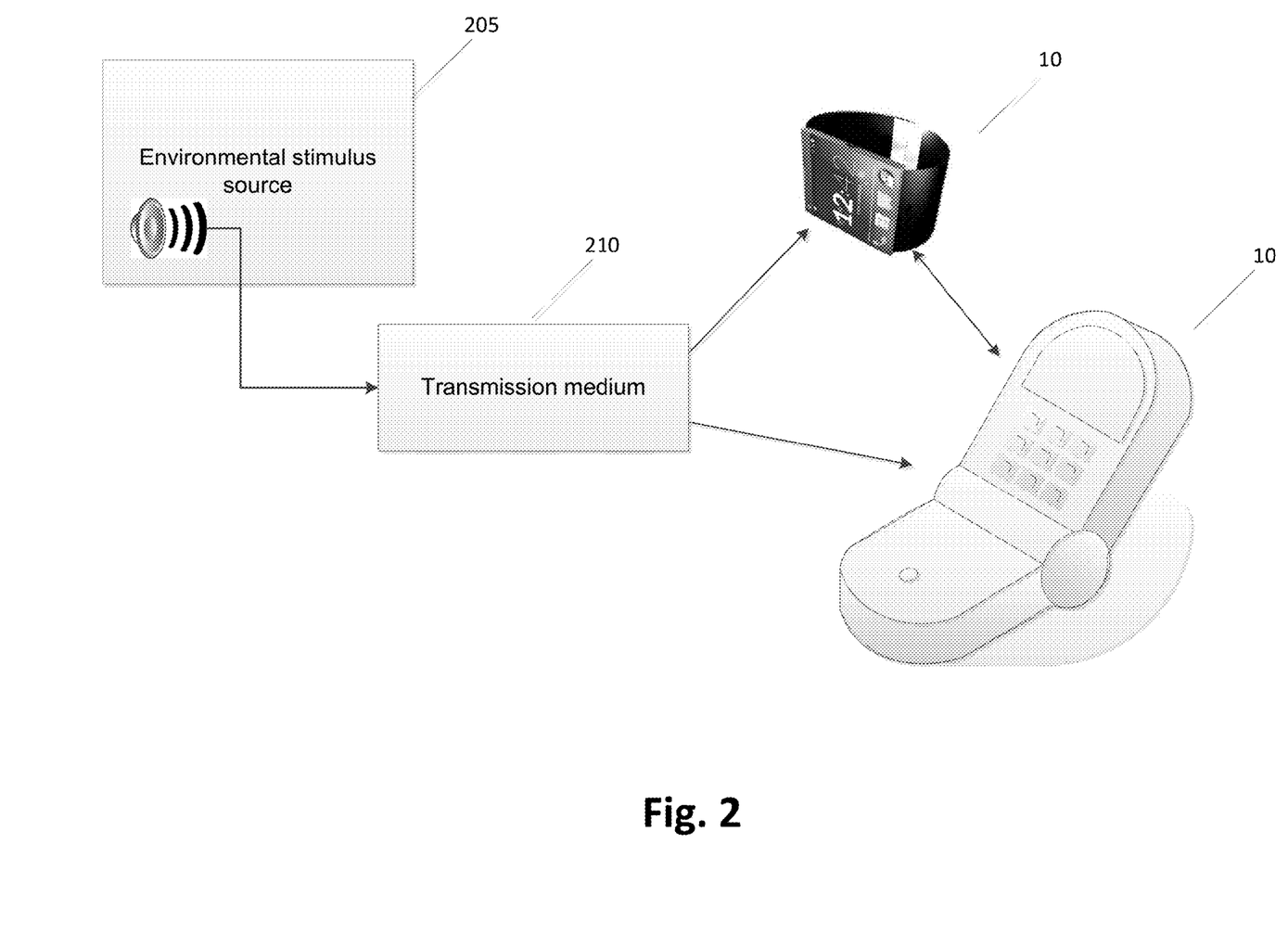
FIG. 2 is a block diagram of a notification system in accordance with one embodiment of the present invention.

FIG. 2 is a block diagram of a notification system in accordance with one embodiment of the present invention. A environmental stimulus source 205 can be output to a transmission medium 210. Devices 220 and 230, such as a smart watch and phone, can correspond to system 10 and can receive the stimulus through the transmission medium. Optionally, devices 220 and 230 can communicate with each other, such as when one device is an accessory of another device. Optionally, devices 220 and 230 can communicate to a cloud based or remote server at 240. In some embodiments, information may obtained from a service (e.g., in the cloud) or may operate in a cloud computing environment. A cloud computing environment (i.e., the "cloud") can be an environment in which computing services are not owned but are provided on demand. For example, information may reside on multiple devices in a networked cloud and/or data can be stored on multiple devices within the cloud. In some embodiments, a remote server can be used to provide information to device 220 or 230.

Figure 3:
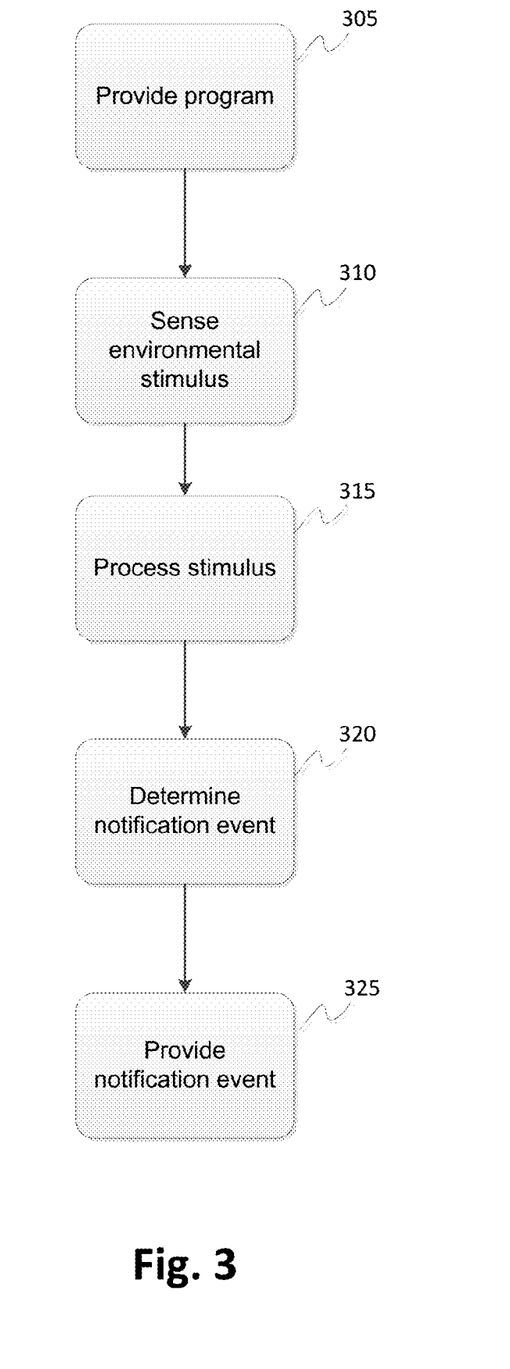
FIG. 3 is a flow diagram for providing notifications in accordance with one embodiment.

FIG. 3 is a flow diagram for providing notifications in accordance with one embodiment. In one embodiment, the functionality of the flow diagram of FIG. 3 (and FIGS. 4-5 and 9 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 305, a program is provided for use on a device, such as system device 10 of FIG. 1. The program may be native to the device, such as an integral part of the device's operating system programs, a program that is provided by the original equipment manufacturer, or a program provided by a third-party creator, such as an application that is user-installed. Third-party applications may be provided at a marketplace for such applications.

At 310, a stimulus is sensed by the device, such as device 10. The device can be in a continuous sensing state. The stimulus can be any ambient stimulus that a sensor located on the device can sense. In some embodiments, the stimulus can be an audio sound wave sensed by a microphone. In some embodiments, the stimulus can be an optical input sensed by an optical sensor (e.g., camera or scanner). In some embodiments, the stimulus can be movement of device 10 sensed by an accelerometer, gyroscope, or pressure sensor. In some embodiments, the stimulus can be a pressure change related to a pressure profile. For example, device 10 could come into direct contact with a surface having a specific static pressure profile (e.g. an embossed surface) or a user could construct a gesture that has a specific pressure profile. This profile could be used to identify a notification event that is then provided back to the user. In some embodiments, the stimulus can be perceivable by a human, while in other embodiments the stimulus may be unperceivable by a human. For example, for an audio signal, the pitch of the audio signal may be outside the sensitivity range of normal human hearing, which is approximately 16-17,000 Hz, but within the sensitivity of a microphone sensor.

At 315, the stimulus can be processed. In some embodiments, the stimulus can be processed by fingerprinting the stimulus. For example, an audio signal can be sampled and fingerprinted. Fingerprinting audio allows the audio to be recognized when comparing an audio signal's fingerprint to a database of audio fingerprints. Any suitable technique can be used for fingerprinting. For example, fingerprinting audio can be done by a process similar to the following. First, the audio signal can be down sampled to reduce the number of possible samples. Next, a spectrogram of the samples can be calculated. Next, frequency band filtering can be performed on the spectrogram to further reduce the complexity of the signal. Filtering can produce logarithmically spaced bins for the spectrogram. Wavelet decomposition can next be used to further reduce complexity, for example, by applying a standard Haar wavelet decomposition. The larger wavelets can be kept while discarding wavelets that do not contribute much information. These fingerprints can be further reduced through minhashing and locality sensitive hashing.

A similar fingerprinting technique can be used for optical or other ambient sensor stimulus. In some embodiments, pattern recognition or other suitable algorithms can be used. For example, a series of bumps in a roadway can produce a pattern that can be sensed by an accelerometer or pressure sensor and processed to determine the user's speed or processed to generate an alert about an approaching intersection. For example, an embossed surface can have a specific pressure profile which can be detected by a pressure sensing device associated with device 10.

In some embodiments, stimulus can be processed by applying an inverse steganographic algorithm to decode a stimulus containing embedded steganographic information. Steganographic information encoding can apply to visual and auditory information. A steganographic algorithm can replace parts of a stimulus with data in a way that is imperceptible to a human. For example, an audio file can have a steganographic signature hidden in it by replacing signal information with message information at periodic intervals. Signal information replaced can include the least significant two bits, for example, so as to minimally impact the audio file when rendered. The inverse operation can also be applied to extract the steganographically encoded signature. The audio can be captured and sampled until a steganographic pattern is found. Information can be captured from the steganographic pattern and used to determine the embedded message. Steganographic data can be made robust to account for lossiness of a captured audio signal. A person of ordinary skill will understand that any other available technique can be substituted for steganography to embed a signature or message in the stimulus audio, video, or other as applicable.

Processing can also include taking the fingerprinted stimulus and comparing it to a database to classify the stimulus. For example, a fingerprinted sound can be used to determine what the sound is. The sound of a siren can be fingerprinted and compared to a database of fingerprints that matches a siren. In the case of a steganographically embedded message, processing can also include analyzing the message and comparing it to a set of known messages or providing the message.

At 320, a notification event is determined based on the processed stimulus. A notification event can include a notification sent to an output mechanism of a device, such as device 30. Output mechanisms can include a display, speaker, haptic output device, and so forth. For example, for a fingerprinted audio stimulus, the recognized audio signal can correspond to a particular haptic effect for alerting the device user. For example, a recognized siren signal can cause a vibrotactile haptic effect to be determined and output on a device. In embodiments using steganographically embedded messages, the notification event can be determined based on the embedded message. For example, the message can contain a byte-code, text, vibration pattern and so forth. For example, the message can contain a code that can be cross-referenced to a haptic effect, audio output, and/or display output signal as a notification event. One or more notification events can be produced based on the processed stimulus. In some embodiments, users can set preferences for what type of notification event or haptic effect should be determined based on a fingerprinted audio stimulus or steganographically embedded message. In some embodiments, a display associated with the device or speaker associated with the device can provide coordinated information. For example, a haptic effect can be determined on a phone in response to a siren, the phone can display an "Emergency" notification on the phone's display, and can play an alarm sound on the phone or a connected Bluetooth speaker.

At 325, the notification event or haptic effect is provided on the device, such as device 30 of FIG. 1. In embodiments where the notification event is a haptic effect, the notification event can be provided by playing or rendering the haptic effect on a haptic output device in the device. In some embodiments, the haptic output device, such as haptic output device 18 of FIG. 1, can be located in a wearable device or located nearby.

Figure 4:
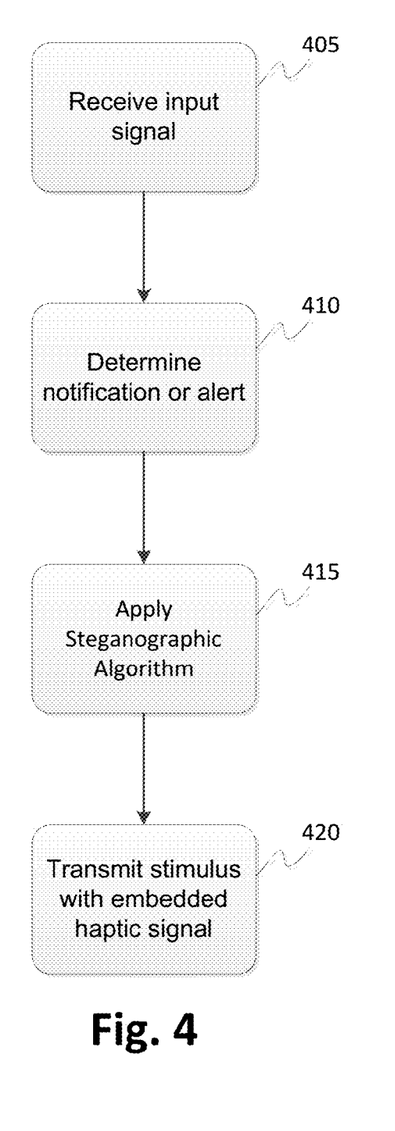
FIG. 4 is a flow diagram for providing a notification with an embedded steganographic message in accordance with one embodiment.

FIG. 4 is a flow diagram for providing a notification with an embedded steganographic message in accordance with one embodiment. At 405, an input signal is received. At 410, a notification is determined to be included in the signal. The notification can be a message or code to a lookup table of messages or similar mechanism, such as a database. In some embodiments, the message or alert can be encrypted for security.

At 415, a steganographic algorithm is applied to embed the notification (i.e., message or code) into the signal to produce a notification signal stimulus including the steganographically embedded message in the input signal. Any appropriate steganographic algorithm can be used. For example, for an audio signal, a steganographic algorithm using least significant bit coding, parity coding, phase coding, spread spectrum, echo hiding, or other suitable algorithm can be used.

At 420, the notification signal stimulus with the embedded steganographic encoding is transmitted. The transmission can be done via speaker if the signal is an audio file. The transmission can be accomplished via a data transmitter (and display if the signal is a visual file). Other embodiments can use other appropriate transmission mediums.

Figure 5:
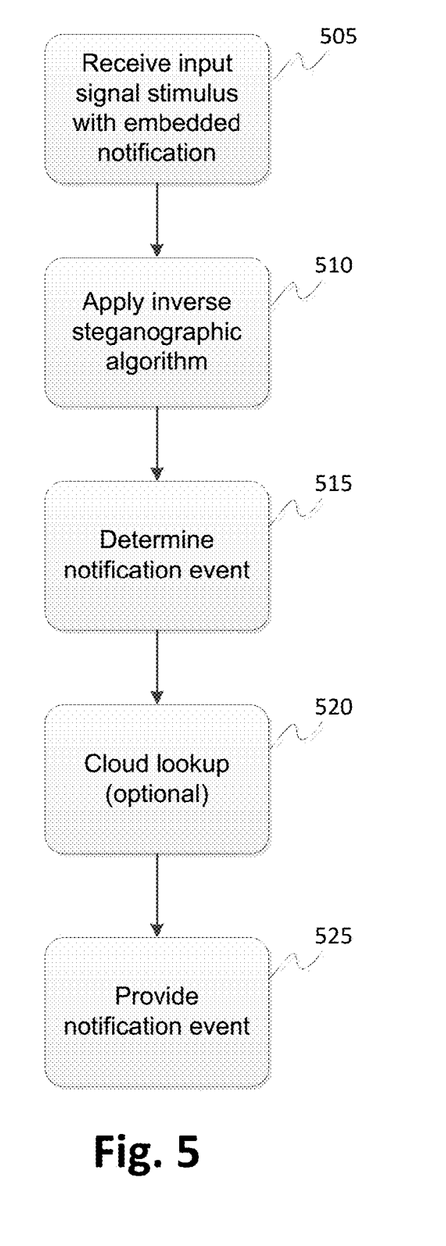
FIG. 5 is a flow diagram for receiving and decoding a notification signal stimulus containing an embedded steganographic message in accordance with one embodiment.

FIG. 5 is a flow diagram for receiving and decoding a notification signal stimulus containing an embedded steganographic message in accordance with one embodiment. At 505, an input stimulus is received that has an embedded steganographic message (i.e., the notification information as a message or code). At 510, an inverse steganography algorithm can be applied. The inverse algorithm can be selected based on the type of algorithm used to create the steganographic stimulus. The algorithm can sample the stimulus to determine how to apply the inverse algorithm. In some embodiments, the decoded message can be decrypted if it was encrypted.

At 515, a notification event, such as a haptic effect, can be determined from the steganographic message. The notification event can be based on or specified by the notification message or can be looked up in a table or database that correlates notification messages to notification events (e.g., a code correlated to a haptic effect). User preferences can specify preferences that can insert or modify lookup entries that correlate notification messages to notification events. At 520, an optional remote data "cloud" lookup can occur either from a cloud, a server, or a local cache from a previous cloud or server response. For example, a received message can be correlated to preferences located in a server and deliver a notification event based on the remote preferences. For example, the message can be a code '0xFFFF' that corresponds to a coupon offering in a store playing music that has a steganographic message embedded therein as a notification message. '0xFFFF' can be looked up locally on a user's device to alert the user to the coupon and provide the message "Sales offering at this store. See associate for details." With a cloud look up, '0xFFFF' can be cross-referenced to additional data stored in the cloud or on a server, such as user preferences, opt-in information, or marketing information, to specify a customized message, such as "Towels are on sale just for you today Phil—buy 2 or more at 25% off each." Using a cloud based lookup, other device information can also be sent to the cloud or server over the data connection to generate the personalized response. For example, the device's International Mobile Equipment Identity ("IMEI") number (typical in phones and other mobile devices), phone number, GPS location, or other available data can be provided to the cloud or server.

At 525, the notification event can be provided. For example, if the notification event is an alert, the alert can be sent to the user's device causing a haptic effect, such as a vibration, and a message can optionally be displayed on the device's display.

Figure 6:
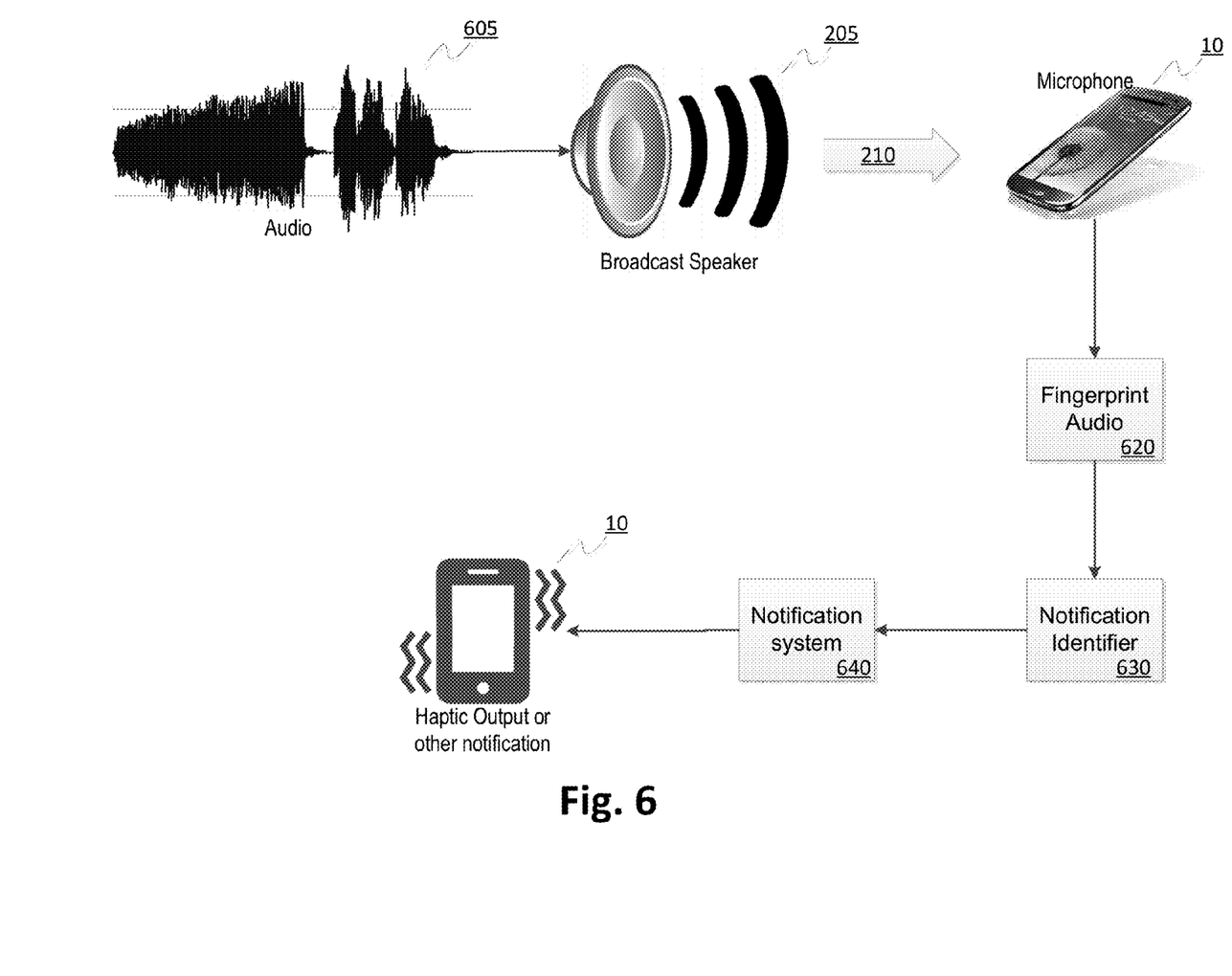
FIG. 6 is a system diagram illustrating an ambient audio notification system in accordance with one embodiment.

FIG. 6 is a system diagram illustrating an ambient audio notification system in accordance with one embodiment. Element 605 is an audio signal represented by a waveform diagram. Element 605 is passed to a speaker 205 which corresponds to environmental stimulus source 205 of FIG. 2. Broadcast speaker 205 transmits the audio signal as a sound in transmission medium 210, which can be air, water, solids, and so forth. A microphone sensor located in a device corresponding to system 10 of FIG. 1 receives the audio. The device has a module to fingerprint the audio at element 620. A notification identifier is determined at module 630 based on the fingerprinted audio and notification information, e.g., information correlating notification event identifiers to notification messages. At module 640, a notification event, such as a haptic effect, can be determined based on the notification event identifier. In some embodiments, haptic notification module 640 can use the "Instinctive Alerts Framework" by Immersion Corp. In some embodiments, a notification event can correspond to an audio output or display output sent to a speaker or display associated with system 10. In some embodiments, a notification event can correspond to a haptic effect that can be played on haptic output device 18 of FIG. 1 associated with system 10 (such as an actuator on a phone or on an accessory device, such as a wearable or other peripheral). In some embodiments a message related to the notification event can be displayed on a display of the device (not shown).

Figure 7:
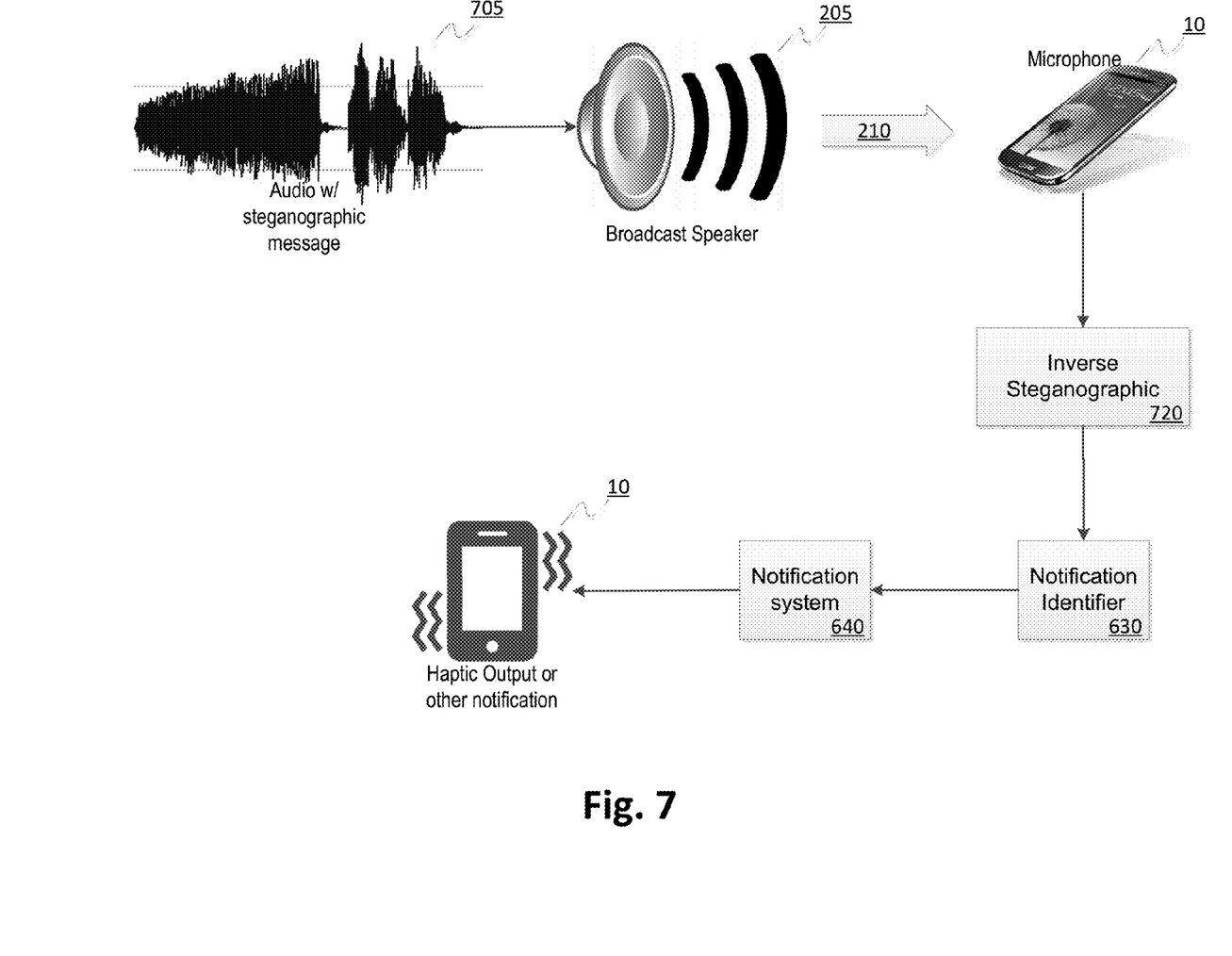
FIG. 7 is a system diagram illustrating an ambient audio notification system in accordance with one embodiment.

FIG. 7 is a system diagram illustrating an ambient audio notification system in accordance with one embodiment. Element 705 is an audio signal represented by a waveform diagram. The audio signal of 705 has an embedded steganographic notification message. Element 705 is passed to a speaker 205 which corresponds to environmental stimulus source 205 of FIG. 2. Broadcast speaker 205 transmits the audio signal as a sound in transmission medium 210, which is air, water, solids, and so forth. A microphone sensor located in a device corresponding to system 10 of FIG. 1 receives the audio. The device has a module to apply an inverse steganographic algorithm at element 720 to retrieve an embedded notification message. The message can be decrypted if it was encrypted for security. A notification event identifier is determined at module 630 based on the embedded message and notification information, e.g., information correlating notification event identifiers to notification messages. At module 640, a notification event can be determined based on the notification event identifier. In some embodiments, a notification event can correspond to an audio output or display output sent to a speaker or display associated with system 10. In some embodiments, a notification event can correspond to a haptic effect that can be played on haptic output device 18 of FIG. 1 associated with system 10 (such as an actuator on a phone or on an accessory device, such as a wearable or other peripheral). In some embodiments a message related to the notification event can be displayed on a display of the device (not shown).

Figure 8:
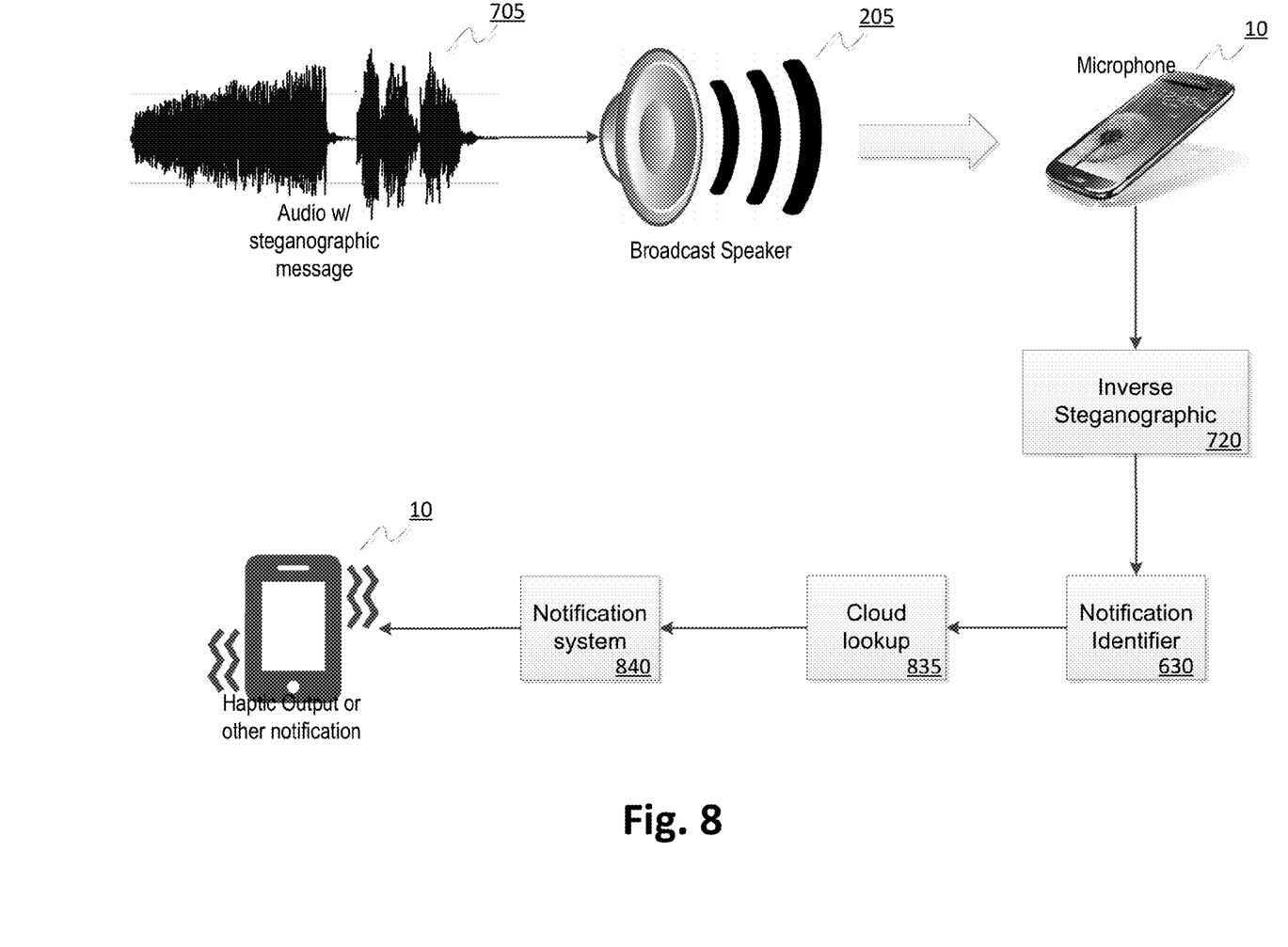
FIG. 8 is a system diagram illustrating an ambient audio notification system in accordance with one embodiment.

FIG. 8 is a system diagram illustrating an ambient audio notification system in accordance with one embodiment. Element 705 is an audio signal represented by a waveform diagram. The audio signal of 705 has an embedded steganographic message. Element 705 is passed to a speaker 205 which corresponds to environmental stimulus source 205 of FIG. 2. Broadcast speaker 205 transmits the audio signal as a sound in transmission medium 210, which can be air, water, solids, and so forth. A microphone sensor located in a device corresponding to system 10 of FIG. 1 receives the audio. The device has a module to apply an inverse steganographic algorithm at element 720 to retrieve an embedded message. The message can be decrypted if it was encrypted for security. A notification event identifier is determined at module 630 based on the embedded message and notification information, e.g., information correlating notification event identifiers to messages. Module 835 can establish a connection to a cloud server or other remote server that uses the message to determine cloud alert information. Cloud based information can include information particular to the user receiving the steganographic message. At module 840, a notification event, such as a haptic effect, can be determined based on the cloud alert information. In some embodiments, a notification event can correspond to an audio output or display output sent to a speaker or display associated with system 10. In some embodiments, a notification event can correspond to a haptic effect that can be played on haptic output device 18 of FIG. 1 associated with system 10 (such as an actuator on a phone or on an accessory device, such as a wearable or other peripheral). In some embodiments a message related to the notification event can be displayed on a display of the device (not shown).

Figure 9:
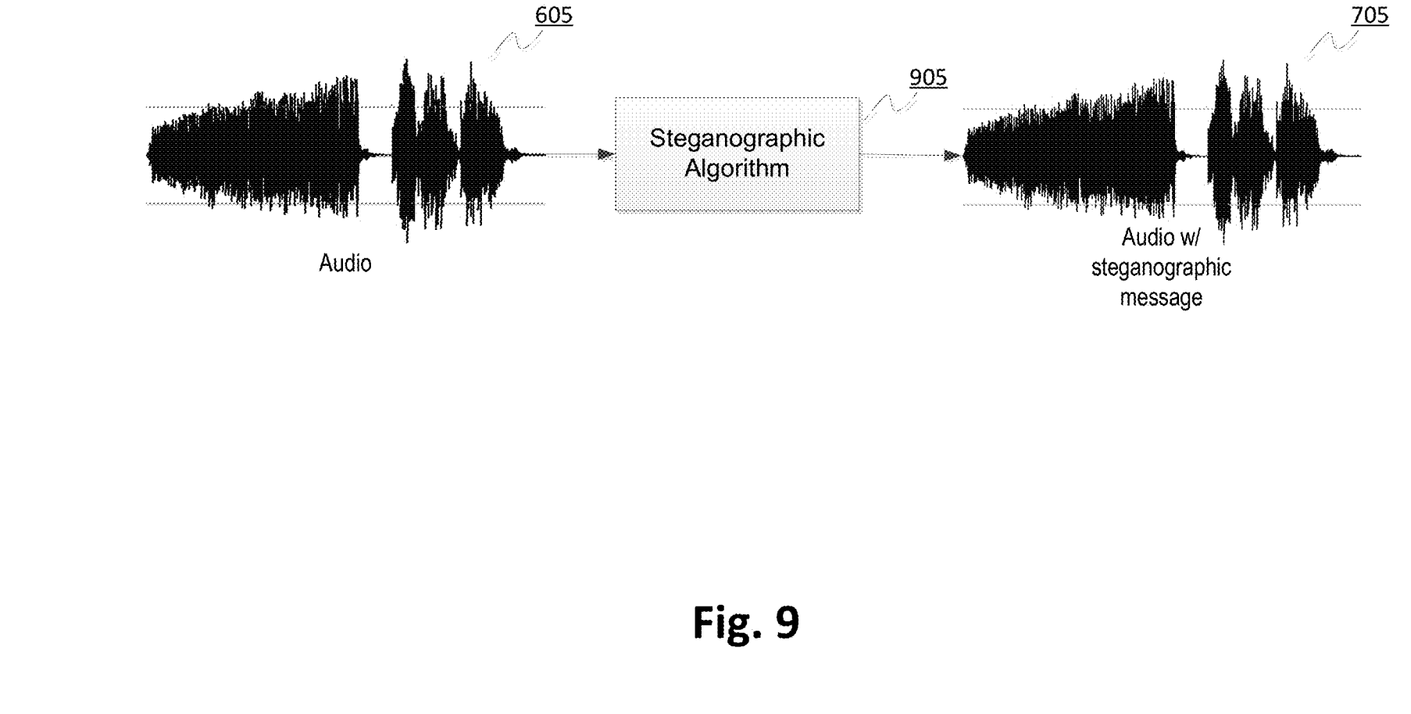
FIG. 9 is a system diagram illustrating an ambient audio notification system in accordance with one embodiment.

FIG. 9 is a system diagram illustrating an ambient audio notification system in accordance with one embodiment. In particular, FIG. 9 illustrates a system for converting an audio signal into an audio signal with an embedded steganographic message or signature. Element 605 is an audio signal. Module 905 is a steganographic algorithm that can be implemented using a general purpose processor or dedicated processor for embedding a message, signature, or other notification information into the audio stream. Module 905 can also include an encryption module to encrypt the message or signature prior to embedding. In some embodiments, the signature can be burned into a chip, such as a microcontroller, FPGA, or the like, that can receive the audio signal, apply the signature, and transmit the audio. Element 705 is an audio signal with an embedded steganographic message or signature. For example, a chirping at a crosswalk can be modified with module 905 with a burned in message or signature to provide a modified chirping sound that is indistinguishable to hear, but contains a steganographic signature.

In some embodiments automatic content recognition ("ACR") can be used to synchronize haptic effects to a stimulus. ACR techniques are typically used to synchronize second screen applications with a media broadcast. Haptic effects or haptic tracks can be synchronized using ACR techniques. Pattern recognition techniques can be used to detect watermarks in an audio signal that specify a timing element of the audio signal. The timing element can be used to estimate the time-stamp of the media elements of a presentation (i.e., being streamed, played back, or displayed as a visual or audio alert element). For example, a song can contain watermarks that change throughout the song. A watermark W can be expected at a time t in the song. When watermark W is found, media accompanying the audio can then be synchronized to time t. In addition, a haptic track for the media can be synchronized to the same time-stamp estimate. In another embodiment, the coded watermark can contain the media's timestamp, i.e., the timestamp for the media is coded as watermark in the media.

In another embodiment, fingerprinting can be used to synchronize haptic effects to an audio stimulus, such as a broadcast audio sound wave. Fingerprinting can be used as described above to identify a particular stimulus (e.g., an audio track). Fingerprinting can further be used to identify a timestamp associated with the fingerprinted portion of the stimulus. For example, a portion of an audio stimulus, as received by a microphone, can be compared to known portions of the stimulus to find where in the source audio the fingerprinted portion is. Using this information about the file, a timestamp can be derived from the file. In another example consistent with another embodiment, a portion of an audio stimulus, as received by a microphone, can be compared to a lookup table (or database or the like) to find the same portion with a timestamp correlated to it.

Embodiments can use ACR techniques to play a haptic track for a stimulus. For example, a song can be recognized according to the flow of FIG. 3, a time-stamp estimated, and a haptic track played (as the haptic effect alert element) synchronized to the song. For example, the song could be the National Anthem of the United States, a fight song at a sporting event, or some other recognizable song. The haptic track does not have to be embedded in the stimulus, but can exist on the device or be downloaded or streamed from the cloud or a server. In lieu of a haptic track, distinctive haptic effects (or alerts) can be triggered based on the timing estimate of the stimulus (e.g., audio track).

In some embodiments, video can be synchronized to an audio track and a haptic track. The tracks can be asynchronous and be synchronized according to watermarks or fingerprints. For example, a clip from a movie could be played. An audio stream can be watermarked or fingerprinted to determine an estimated time-stamp for the clip and an associated haptic track for the entire movie can be skipped to the relevant time according to the estimated time-stamp of the audio clip.

In another embodiment, the device, such as device 10 of FIG. 1, can have an embedded set of haptic effects identified by codes. Instead of creating a haptic track or specific haptic effects, information can be embedded using steganographic or other techniques into the audio track. The embedded information can contain haptic effect codes and associated parameters, such as intensity, duration, relative timing, and so forth. When the haptic playback system detects an embedded effect code and parameters, it can prepare a haptic effect according to the effect code and parameters and deliver it at a specified relative timing.

Figure 10:
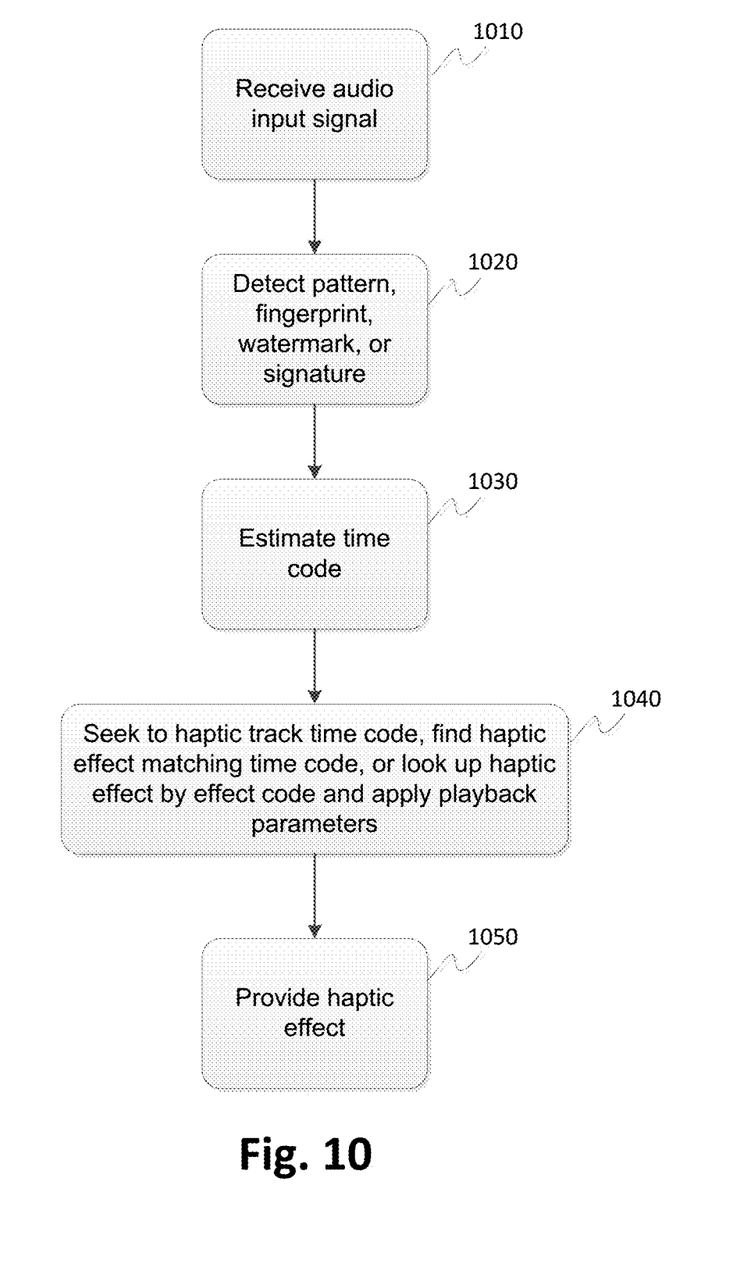
FIG. 10 is a flow diagram illustrating synchronizing haptic effects in accordance with some embodiments.

FIG. 10 is a flow diagram illustrating synchronizing haptic effects in accordance with some embodiments. At 1010, an audio input signal is received. As disclosed above, the audio input signal may optionally be in a pitch range that is outside the normal range for human hearing. The audio signal may have an embedded signature or watermark specifying a time code, haptic effect code, and parameters. In some embodiments, time code information can be estimated from a fingerprint of the audio signal. At 1020, a pattern, fingerprint, watermark, or signature can be detected in the audio signal. At 1030, a time-code can be estimated from the pattern, fingerprint, watermark, or signature. In some embodiments, 1030 can be skipped, such as when an effect code for a haptic effect is embedded in a watermark or signature. At 1040, if a haptic track is used, the haptic track can be skipped to the estimated time code. If haptic effects are matched to time codes, a haptic effect can be retrieved for the estimated time code. If a haptic effect code is used, then a haptic effect can be looked up according to the haptic effect code and optional parameters can be set for playing the haptic effect. At 1050, the haptic effect is played on the haptic output device, such as haptic output device 18 of FIG. 1.

One example of the use of the flow of FIG. 10 is where a user is watching a movie on television. The user's wrist wearable device can be embedded with some haptic tracks related to different movies. On capturing and identifying a specific audio watermark in the movie, the ACR system synchronizes the haptic track to the media and starts playing back the related haptic track/effects on the wearable. Another example is where a user is watching the Stanley Cup final game on his tablet which is augmented with haptic playback features as described herein. Haptic effects parameters related to the game stream are embedded as watermarks in the audio signal of the game. When analyzing the audio signal, the system can detect the watermark and playback a haptic effect, with the specific parameters.

As disclosed, embodiments provide a system for generating a notification event, such as a haptic effect alert, that can accompany a visual or audio alert on a smart phone, smart device, or peripheral. An environmental ambient condition can provide a stimulus that is detected by a sensor on the device. The stimulus can be processed for pattern recognition, fingerprinting, watermarking, or signature information. The information can be matched to a database of known patterns or fingerprints, or in the case of watermarking or signature embedding, information can be extracted specifying alert or haptic information. The processed information can be passed to the notification system that causes a notification event to occur on the device. Some embodiments do not require a previous relationship or data connection. Some embodiments can use a data connection and/or preferences established from a previous relationship to augment or customize the alert output. Some embodiments can synchronize haptic effect information with an audio signal using these techniques.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of rendering a haptic effect, comprising:
   receiving an ambient environmental stimulus signal with an embedded message, wherein the ambient environmental stimulus signal was generated by a sensor and then embedded with a message;
   decoding the embedded message within the ambient environmental stimulus signal;
   determining a notification event based on the decoded embedded message; and
   rendering a haptic effect on a haptic output device based on the notification event.

2. The method of claim 1, wherein the ambient environmental stimulus signal comprises an audio input, a motion input, or a visual input.

3. The method of claim 2, wherein the audio input is outside a normal range for human hearing.

4. The method of claim 1, wherein the notification event is associated with an alert.

5. The method of claim 1, wherein the determining comprises:
   taking a fingerprint of the ambient environmental stimulus signal;
   comparing the fingerprint to a database of fingerprints; and
   selecting the notification event based on the fingerprint.

6. The method of claim 1, wherein decoding the embedded message within the ambient environmental stimulus signal comprises:
   detecting an embedded steganographic message, wherein the embedding of the message is accomplished through the use of steganography; and
   determining the notification event based on the steganographic message.

7. The method of claim 1, further comprising:
   estimating a time-code for the ambient environmental stimulus signal; and
   selecting the haptic effect to render based on the estimated time-code.

8. The method of claim 1, wherein the sensor is associated with a peripheral device.

9. A system for rendering a haptic effect, comprising:
   a receiver configured to receive an ambient environmental stimulus signal with an embedded message, wherein the ambient environmental stimulus signal was generated by a sensor and then embedded with a message;
   the receiver further configured to decode the embedded message within the ambient environmental stimulus signal;
   a processor configured to determine a notification event based on the decoded embedded message; and
   a haptic output device configured to render a haptic effect based on the notification event.

10. The system of claim 9, wherein the ambient environmental stimulus signal comprises an audio input, a motion input, or a visual input.

11. The system of claim 10, wherein the audio input is outside a normal range for human hearing.

12. The system of claim 9, wherein the notification event is associated with an alert.

13. The system of claim 9, wherein the process module is further configured to:
   take a fingerprint of the ambient environmental stimulus signal;
   compare the fingerprint to a database of fingerprints; and
   select the notification event based on the fingerprint.

14. The system of claim 9, wherein the receiver is further configured to:
   detect an embedded steganographic message in the decoded embedded message within the ambient environmental stimulus signal, wherein the embedding of the message is accomplished through the use of steganography; and
   determine the notification event based on the steganographic message.

15. The system of claim 9, further comprising a time-code estimation module configured to estimate a time-code for the ambient environmental stimulus signal, wherein the process module is further configured to determine the haptic effect based on the estimated time-code.

16. The system of claim 9, wherein the sensor is associated with a peripheral device.

17. A non-transitory computer readable medium with instructions stored thereon to render a haptic effect, the rendering comprising:
   receiving an ambient environmental stimulus signal with an embedded message, wherein the ambient environmental stimulus signal was generated by a sensor and then embedded with a message;
   decoding the embedded message within the ambient environmental stimulus signal;
   determining a notification event based on the decoded embedded message; and
   rendering a haptic effect on a haptic output device based on the notification event.

18. The non-transitory computer readable medium of claim 17, wherein the ambient environmental stimulus signal comprises an audio input, a motion input, or a visual input.

19. The non-transitory computer readable medium of claim 18, wherein the audio input is outside a normal range for human hearing.

20. The non-transitory computer readable medium of claim 17, wherein the haptic effect is associated with an alert.

21. The non-transitory computer readable medium of claim 17, wherein the determining comprises:
   taking a fingerprint of the ambient environmental stimulus signal;
   comparing the fingerprint to a database of fingerprints; and
   selecting the notification event based on the fingerprint.

22. The non-transitory computer readable medium of claim 17, wherein decoding the message embedded within the received ambient environmental stimulus signal further comprises:
   detecting an embedded steganographic message, wherein the embedding of the message is accomplished through the use of steganography; and
   determining the notification event based on the steganographic message.

23. The non-transitory computer readable medium of claim 17, further comprising:
   estimating a time-code for the ambient environmental stimulus signal; and
   selecting the haptic effect to render based on the estimated time-code.

24. The non-transitory computer readable medium of claim 17, wherein the sensor is associated with a peripheral device.

* * * * *